(12) United States Patent
Cho et al.

(10) Patent No.: US 10,797,317 B2
(45) Date of Patent: Oct. 6, 2020

(54) CATHODE ACTIVE MATERIAL FOR LITHIUM ION SECONDARY BATTERIES, METHOD FOR MANUFACTURING THE SAME, AND LITHIUM ION SECONDARY BATTERIES INCLUDING THE SAME

(71) Applicant: UNIST(ULSAN NATIONAL INSTITUTE OF SCIENCE AND TECHNOLOGY), Ulsan (KR)

(72) Inventors: Jaephil Cho, Ulsan (KR); Moon Su Yoon, Ulsan (KR)

(73) Assignee: UNIST(ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 159 days.

(21) Appl. No.: 15/761,047

(22) PCT Filed: Nov. 24, 2017

(86) PCT No.: PCT/KR2017/013523
§ 371 (c)(1),
(2) Date: Mar. 16, 2018

(87) PCT Pub. No.: WO2019/088340
PCT Pub. Date: May 9, 2019

(65) Prior Publication Data
US 2019/0296349 A1    Sep. 26, 2019

(30) Foreign Application Priority Data
Oct. 31, 2017 (KR) .................... 10-2017-0144233

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/485* (2013.01); *H01M 4/62* (2013.01);
(Continued)

(58) Field of Classification Search
CPC ...... H01M 4/525; H01M 4/131; H01M 4/485; H01M 10/058
See application file for complete search history.

(56) References Cited

U.S. PATENT DOCUMENTS 8,748,042 B2   6/2014 Watanabe et al.
9,209,455 B2 † 12/2015 Ofer
(Continued)

FOREIGN PATENT DOCUMENTS

CN      100426564      10/2008
CN      103022499       4/2013
(Continued)

OTHER PUBLICATIONS

World Intellectual Property Organization, International Search Report, dated Jul. 19, 2018, International Application No. PCT/KR2017/013521.
(Continued)

*Primary Examiner* — Kenneth J Douyette
(74) *Attorney, Agent, or Firm* — Klarquist Sparkman, LLP

(57) ABSTRACT

Provided is a composite cathode active material including: a core including a lithium transition metal oxide, the lithium transition metal oxide being doped with nickel (Ni) and at least one element selected from Group 4 to Group 13 elements and having a layered crystalline phase belonging to the Space Group R-3m; and a coating layer on a surface of the core, the coating layer including a cobalt compound.

17 Claims, 9 Drawing Sheets

(51) Int. Cl.
*H01M 4/485* (2010.01)
*H01M 10/058* (2010.01)
*H01M 10/0525* (2010.01)
*H01M 4/62* (2006.01)
*H01M 4/02* (2006.01)

(52) U.S. Cl.
CPC ..... *H01M 10/058* (2013.01); *H01M 10/0525* (2013.01); *H01M 2004/027* (2013.01)

(56) References Cited

U.S. PATENT DOCUMENTS

| | | | |
|---|---|---|---|
| 9,979,014 | B2 | 5/2018 | Kim et al. |
| 2006/0115730 | A1* | 6/2006 | Taniguchi ............. H01M 4/525 429/217 |
| 2013/0247363 | A1 | 9/2013 | Nelson et al. |
| 2014/0197357 | A1* | 7/2014 | Ofer ...................... H01M 4/364 252/182.1 |
| 2015/0380736 | A1 | 12/2015 | Park et al. |
| 2016/0156032 | A1 | 6/2016 | Lee et al. |
| 2016/0181611 | A1† | 6/2016 | Cho |
| 2016/0211517 | A1 | 7/2016 | Beck et al. |
| 2017/0301909 | A1 | 10/2017 | Lee et al. |
| 2017/0317342 | A1 | 11/2017 | Kang et al. |

FOREIGN PATENT DOCUMENTS

| | | |
|---|---|---|
| EP | 2325930 | 5/2011 |
| KR | 2015-0070853 A | 6/2015 |
| KR | 10-2015-0141254 A | 12/2015 |
| KR | 10-2016-0002200 A | 1/2016 |
| KR | 10-2016-0040118 A | 4/2016 |
| KR | 10-2016-0064881 A | 6/2016 |

OTHER PUBLICATIONS

Korean Intellectual Property Office, Office Action, dated Nov. 5, 2018, issued in Republic of Korea Patent Application No. 10-2017-0144233.
Extended Search Report for European Patent Application No. 17847774.1, dated Dec. 9, 2019.
Daniel, C., Mohanty, D., Li, J., Wood, D.L., "Cathode Materials Review", AIP Conference Proceedings 1597, 26 (2014) ("Daniel").†

\* cited by examiner
† cited by third party

CATHODE ACTIVE MATERIAL FOR LITHIUM ION SECONDARY BATTERIES, METHOD FOR MANUFACTURING THE SAME, AND LITHIUM ION SECONDARY BATTERIES INCLUDING THE SAME

TECHNICAL FIELD

The present disclosure relates to a cathode active material for a secondary battery, a method of preparing the cathode active material, and a secondary battery including the cathode active material.

BACKGROUND ART

As technological development and demand for mobile devices has increased, the demand for secondary batteries as sources of energy storage is rapidly increasing, and active research into the development of related technologies is ongoing. In a lithium secondary battery, which uses lithium ions as a charge carrier, a charging and discharging mechanism is based on oxidation and reduction reactions of a transition metal in a transition metal oxide. A lithium secondary battery consists of a cathode and an anode which have an ion exchange membrane disposed therebetween, and a liquid electrolyte.

Along with the development of high-voltage electronic parts and electronic devices in which such high-voltage electronic parts are integrated, the demand for high-capacity secondary batteries is increasing, and the demand for long-lifespan secondary batteries available for various purposes is also substantial. Accordingly, in order to develop a lithium ion secondary battery having high capacity and long lifetime characteristics, there have been efforts to improve both cathode capacity and lifetime characteristics.

Reportedly, so far Ni-rich cathode active materials containing a large amount of Ni have been mainly used and researched as high-capacity cathode materials. However, due to the use of co-precipitation that is necessary in synthesis of such Ni-rich cathode active materials, the final active material inevitably has the form of secondary particles. In this regard, a limitation in electrode density (~3.0 g/cc for Ni-rich cathode active material, and ~3.8 g/cc for LiCoO$_2$) of such secondary-particle-type active materials has been noted as a problem. Furthermore, micro-cracking also occurs in the secondary particles with repeated charging and discharging for a long period, a side reaction is caused due to direct contact between the active material and the liquid electrolyte which leaks through cracks, and consequently, loss of the active material and the electrolyte may cause reduction in electrode energy density and lifetime characteristics.

Conventional lithium cobalt oxide (LiCoO$_2$) is a single crystal and has a theoretical capacity of about 274 mAh/g. However, due to irreversible structural changes of the cathode active material and leakage of Co during charging and discharging, use of the cathode active material in a high voltage range is restricted. Accordingly, despite its high electrode density, use of single-crystal lithium cobalt oxide as a high-energy-density material is limited.

Therefore, there still is a need for a cathode active material having a high energy density, a high capacity, and long lifetime characteristics, while being usable in a high voltage range.

SUMMARY OF INVENTION

Technical Problem

The disclosure provides a novel composite cathode active material.

The disclosure provides a method of preparing the composite cathode active material.

The disclosure provides a cathode including the composite cathode active material.

The disclosure provides a lithium secondary battery using a cathode including the composite cathode active material.

Solution to Problem

According to an aspect of the disclosure, there is provided a composite cathode active material including:

a core including a lithium transition metal oxide, wherein the lithium transition metal oxide is represented by Formula 1, is doped with nickel (Ni) and at least one element selected from Group 4 to Group 13 elements, and has a layered crystalline phase belonging to the Space Group R-3m; and a coating layer on a surface of the core, the coating layer including a cobalt compound:

$$Li_xM1O_2 \qquad \text{<Formula 1>}$$

wherein, in Formula 1, 1.00≤x≤1.04, and

M1 may include cobalt (Co), nickel (Ni), and at least one element selected from Group 4 to Group 13 elements.

According to an aspect of the disclosure, there is provided a method of preparing the above-described composite cathode active material, the method including:

preparing a precursor compound of the lithium transition metal oxide represented by Formula 1;

thermally treating the precursor compound to thereby obtain the core including the lithium transition metal oxide);

forming, on a surface of the core including lithium transition metal oxide, the coating layer including a cobalt oxide.

According to an aspect of the disclosure, there is provided a cathode including the above-described composite cathode active material.

According to an aspect of the disclosure, there is provided a lithium secondary battery including the above-described cathode.

Advantageous Effects of Invention

According to the one or more embodiments, by including a core including a single-crystal, nickel-doped lithium transition metal oxide, and a coating layer on a surface of the core, wherein the coating layer includes a cobalt compound, the composite cathode active material may have improved structural stability and lifetime characteristics at a high voltage. A lithium secondary battery including the composite cathode active material may have improved charge/discharge characteristics and may inhibit gas generation.

REFERENCE SIGNS LIST

Figure 1:
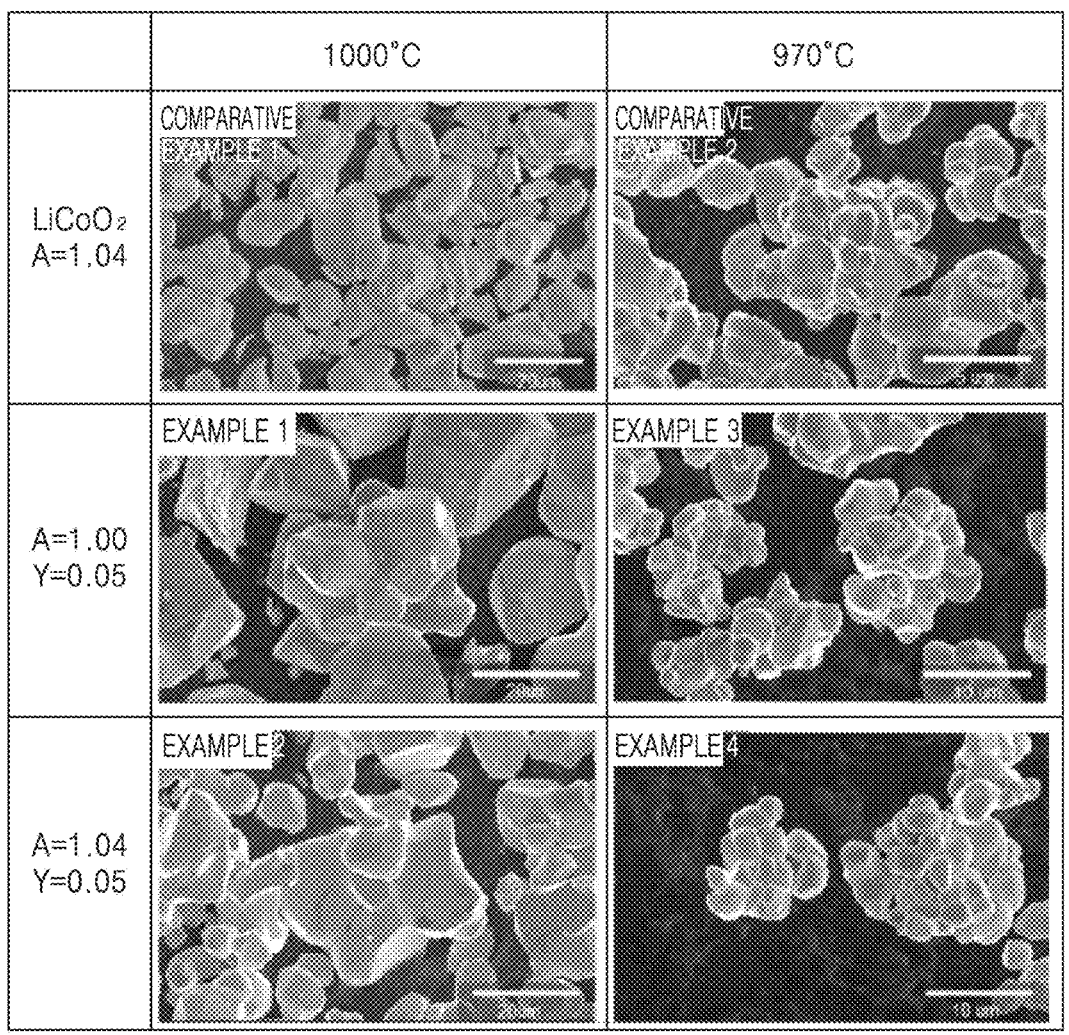
FIG. 1 shows scanning electron microscope (SEM) image of cathode active materials prepared in Examples 1 to 4 and Comparative Examples 1 and 2.

| | |
|---|---|
| 1: lithium battery | 2: anode |
| 3: cathode | 4: separator |
| 5: battery case | 6: cap assembly |

DESCRIPTION OF EMBODIMENTS

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Hereinafter, a composite cathode active material according to one or more embodiments, and a lithium secondary battery using a cathode including the composite cathode active material, according to one or more embodiments, will be described in greater detail.

In accordance with an aspect of the disclosure, a composite cathode active material includes: a core including a lithium transition metal oxide, wherein the lithium transition metal oxide is represented by Formula 1, is doped with nickel (Ni) and at least one element selected from Group 4 to Group 13 elements, and has a layered crystalline phase belonging to the Space Group R-3m; and a coating layer on a surface of the core, the coating layer including a cobalt compound.

$$Li_xM1O_2 \qquad \text{<Formula 1>}$$

wherein, in Formula 1, $1.00 \leq x \leq 1.04$, and

M1 comprises cobalt (Co), nickel (Ni), and at least one element selected from Group 4 to Group 13 elements.

The Group 4 to Group 13 elements are not specifically limited, for example, may be selected from magnesium (Mg), aluminum (Al), titanium (Ti), and zirconium (Zr).

By the inclusion of Li and Co as major elements, and Ni and the at least one element selected from the Group 4 to Group 13 elements as doping elements, the composite cathode active material having a layered structure may have stabilized crystalline structure and prevent disintegration of the crystalline structure caused from intercalation and deintercation of lithium. Even when lithium is released from the composite cathode active material during charging, nickel (Ni) ions may migrate into a lithium layer to fill in lattice spaces from which the lithium has been released, thus effectively preventing disintegration of the crystalline structure. Due to the stabilization of the crystalline structure, it may be possible to reduce the release of the active material which may occur due to the disintegration of the crystalline structure during a charging/discharging process, and a side reaction between the active material and liquid electrolyte, and thus to improve reversible capacity and cycle characteristics, and also lifetime characteristics and stability of a battery.

By inclusion of the coating layer on the surface of the composite cathode active material, the coating layer including a cobalt compound, highly reactive $Ni^{3+}$ ions present in a large amount in a transition metal layer may be partially reduced into $Ni^{2+}$ ions, so that interfacial reactivity of the composite cathode active material may be reduced. Accordingly, release of the active material at the surface thereof may be inhibited, and deterioration of the composite cathode active material may be prevented.

In some embodiments, the composite cathode active material may be a single crystal, and the Ni ions may be located at an octahedral site in the single crystal.

In the composite cathode active material according to one or more embodiments, the content of Co in M1 in the lithium transition metal oxide represented by Formula 1 may be the largest among the elements in M1. Since the composite cathode active material according to one or more embodiments is a single crystal form, the composite cathode active material may provide a higher electrode density to an electrode formed of the composite cathode active material, compared to a cathode active material formed as secondary particles which are agglomerates of small particles.

In the composite cathode active material according to one or more embodiments, a ratio of moles of Li to the total moles of Co and Ni (Li/(Co+Ni)) in the lithium transition metal oxide may satisfy 1.00≤Li/(Co+Ni)≤1.04. When Li, Co, and Ni are mixed in a mole ratio within this range, a lithium cobalt oxide having a layered structure may be formed. For example, when a cobalt precursor and a lithium precursor are mixed at a mole ratio that satisfies 1≤Li/(Co+Ni)≤1.02, reversible capacity, lifetime characteristics, and thermal stability may be further improved.

For example, the lithium transition metal oxide in the composite cathode active material may be represented by Formula 2.

$$Li_xCo_{1-y-z}Ni_yM2_zO_2 \qquad <Formula\ 2>$$

In Formula 2, 1.00≤x≤1.04, 0.05≤y≤0.1, and 0.001≤z≤0.007. For example, in Formula 2, 0.07≤y≤0.1 and 0.001≤z≤0.007.

In Formula 2, M2 may be at least one element selected from magnesium (Mg), aluminum (Al), titanium (Ti), and zirconium (Zr). For example, M2 may be Mg, Ti, or Ti and Mg.

For example, the lithium transition metal oxide in the composite cathode active material may be represented by Formula 3.

$$Li_xCo_{1-y-z}Ni_yM3_qM4_rO_2 \qquad <Formula\ 3>$$

In Formula 3, 1.00≤x≤1.04, 0.05≤y≤0.1, 0<q<0.005, 0<r<0.005, and 0.001≤q+r≤0.007. For example, in Formula 3, 0.07≤y≤0.1, 0<q<0.005, 0<r<0.005, and 0.001≤q+r≤0.007.

In Formula 3, M3 and M4 may be different from one another and may each independently selected from magnesium (Mg), aluminum (Al), titanium (Ti), and Zirconium (Zr). For example, M3 may be Mg or Ti. For example, M4 may be different from T3, and for example, may be Ti or Mg.

For example, a Ni content in the lithium transition metal oxide may be about 5 mol % to about 10 mol % with respect to 100 mol % of the lithium transition metal oxide. When the Ni content is within this range, the composite cathode active material may have improved stability, reversible capacity, and lifetime characteristics.

In some embodiments, the composite cathode active material may have an average particle diameter of about 0.5 μm to about 25 μm. However, the average particle diameter of the composite cathode active material is not limited to this range, and may have any range of two values within this range. In some embodiments, the composite cathode active material may have an average particle diameter of about 0.5 μm to about 24 μm, for example, about 0.5 μm to about 23 μm, for example, 0.5 μm to about 22 μm, for example, about 0.5 μm to about 21 μm, for example, about 0.5 μm to about 20 μm, for example, about 0.5 μm to about 15 μm, and for example, about 0.5 μm to about 10 μm. In some other embodiments, the composite cathode active material may have an average particle diameter of about 0.6 μm to about 25 μm, for example, about 0.7 μm to about 25 μm, for example, about 0.8 μm to about 25 μm, for example, about 0.9 μm to about 25 μm, for example, about 1.0 μm to about 25 μm, for example, about 1.5 μm to about 25 μm, for example, about 2.0 μm to about 25 μm, for example, about 5.0 μm to about 25 μm, and for example, about 10 μm to about 25 μm.

The coating layer may entirely or partially coat the surface of the lithium transition metal oxide. For example, the coating layer may be coated on about 90% or less of the surface of the lithium transition metal oxide. For example, the coating layer may be coated on about 80% or less, for example, about 70% or less, for example, 60% or less, for example, about 50% or less, for example, about 40% or less, for example, about 30% or less, for example, about 20% or less, and for example, about 10% or less of the surface of the lithium transition metal oxide.

In the composite cathode active material according to one or more embodiments, the content of the cobalt compound in the coating layer may be about 0.5 parts to about 5.0 parts by weight with respect to 100 parts by weight of the composite cathode active material. When the content of the cobalt compound is within this range, $Ni^{3+}$ ions or $Co^{4+}$ present in a large amount in a transition metal layer may be reduced into $Ni^{2+}$ or $Co^{3+/2+}$, or both of these ions may be reduced at the same time, during a synthesis process of the composite cathode active material, so that interfacial reactivity between the composite cathode active material and liquid electrolyte may be reduced.

The coating layer may have a thickness of about 1 nm to about 50 nm. The coating layer may have, on an outermost surface of the cathode active material, a rock salt structure belonging to the Space Group Fm-3m, a spinel-like structure, or a structure in which a transition metal may gradually and increasingly occupy a Li layer toward the core, wherein these three structures may be locally present separately or in a combination of the three structures.

Hereinafter, a method of preparing the composite cathode active material according to the one or more embodiments will be described.

In accordance with another aspect of the disclosure, a method of preparing a composite cathode active material includes:

preparing a precursor compound of a lithium transition metal oxide represented by Formula 1;

thermally treating the precursor compound to thereby obtain a core including the lithium transition metal oxide;

forming, on a surface of the core including lithium transition metal oxide, a coating layer including a cobalt oxide.

$$Li_xM1O_2 \qquad <Formula\ 1>$$

wherein, in Formula 1, 1.00≤x≤1.04, and M1 may include cobalt (Co), nickel (Ni), and at least one element selected from Group 4 to Group 13 elements.

In some embodiments, the preparing of the precursor compound of the lithium transition metal oxide may include mechanically mixing a lithium precursor compound, a cobalt precursor compound, a nickel precursor compound, and a precursor compound (hereinafter, referred to also as an 'additional doping element precursor compound') of at least one element selected from Group 4 to Group 13 elements in an atmospheric or oxidizing condition.

Mechanical mixing refers to grinding and mixing materials that are to be mixed together, by applying a mechanical force such as to form a uniform mixture. Mechanical mixing may be performed using a mixing device, for example, a ball mill using chemically inert beads, a planetary mill, a stirred ball mill, or a vibrating mill. To attain improved mixing effects, optionally a small amount of alcohol such as ethanol, or a higher fatty acid such as stearic acid may be added.

Through the mechanical mixing, a mixture in which the above-described precursors are uniformly distributed may be obtained.

The lithium precursor compound may include a lithium-containing hydroxide, a lithium-containing sulfate, a lithium-containing alkoxide, a lithium-containing oxalate, a lithium-containing phosphate, a lithium-containing halide, a lithium-containing oxyhalide, a lithium-containing sulfide, a lithium-containing oxide, a lithium-containing peroxide, a lithium-containing acetate, a lithium-containing nitrate, a lithium-containing carbonate, a lithium-containing citrate, a lithium-containing phthalate, a lithium-containing perchlorate, or a combination thereof. For example, the lithium precursor may include at least one compound selected from $Li_2CO_3$, $LiNO_3$, $LiNO_2$, $LiOH$, $LiOH.H_2O$, $LiH$, $LiF$, $LiCl$, $LiBr$, $LiI$, $CH_3COOLi$, $Li_2O$, $Li_2SO_4$, $CH_3COOLi$, and $Li_3C_6H_5O_7$.

The cobalt precursor compound may include a cobalt-containing hydroxide, a cobalt-containing sulfate, a cobalt-containing alkoxide, a cobalt-containing oxalate, a cobalt-containing phosphate, a cobalt-containing halide, a cobalt-containing oxyhalide, a cobalt-containing sulfide, a cobalt-containing oxide, a cobalt-containing peroxide, a cobalt-containing acetate, a cobalt-containing nitrate, a cobalt-containing carbonate, a cobalt-containing citrate, a cobalt-containing phthalate, a cobalt-containing perchlorate, or a combination thereof. For example, the cobalt precursor may include at least one compound selected from $CO_3O_4$, $Co(OH)_2$, $CoO$, $CoOOH$, $Co(OCOCH_3)_2.4H_2O$, $Co(NO_3)_2.6H_2O$, and $Co(SO_4)_2.7H_2O$.

The nickel precursor compound may include at least one selected from a nickel-containing hydroxide, a nickel-containing sulfate, a nickel-containing alkoxide, a nickel-containing oxalate, a nickel-containing phosphate, a nickel-containing halide, a nickel-containing oxyhalide, a nickel-containing sulfide, a nickel-containing oxide, a nickel-containing peroxide, a nickel-containing acetate, a nickel-containing nitrate, a nickel-containing carbonate, a nickel-containing citrate, a nickel-containing phthalate, a nickel-containing perchlorate, or a combination thereof. For example, the nickel precursor may include at least one compound selected from $NiSO_4.6H_2O$, $Ni(CHCOO)_2$, and $Ni(NH_2SO_3)_2$.

The additional doping element precursor compound may include, for example, at least one compound selected from a hydroxide, a sulfate, an alkoxide, an oxalate, a phosphate, a halide, an oxyhalide, a sulfide, an oxide, a peroxide, an acetate, a nitrate, a carbonate, a citrate, a phthalate, and a perchlorate, each containing at least one element selected from titanium (Ti), magnesium (Mg), aluminum (Al), and zirconium (Zr).

The mechanical mixing may be performed using mechanical milling. The mechanical mixing by mechanical milling may be performed using, for example, a roll-mill, a ball-mill, a high-energy ball mill, a planetary mill, a stirred ball mill, a vibrating mill, or a jet-mill. For example, in the mechanical mixing, a compressive stress may be mechanically applied at a high rotating speed, for example, at about 100 rpm to about 2,000 rpm. The mechanical mixing may be performed for, for example, about 20 minutes to about 10 hours, or about 30 minutes to about 3 hours. However, the mechanical mixing time is not limited thereto, and may be varied.

In some embodiments, the thermal treatment may include a first thermal treatment step and a second thermal treatment step, the second thermal treatment may be performed after the first thermal treatment step, and a thermal treatment temperature in the first thermal treatment step may be lower than a thermal treatment temperature in the second thermal treatment step.

The first thermal treatment step and the second thermal treatment step may be performed in separate chambers or in the same chamber. When the first thermal treatment step and the second thermal treatment step are performed in the same chamber, a rest period may be between the first thermal treatment step and the second thermal treatment step.

In some embodiments, the first thermal treatment step may include thermal treatment at a temperature of about 300° C. to about 500° C. under an atmospheric or oxidizing condition for about 3 hours to about 5 hours.

For example, the thermal treatment temperature of the first thermal treatment step may be selected from a range of about 300° C. to about 500° C., a range of 310° C. to about 500° C., a range of about 320° C. to about 500° C., a range of about 330° C. to about 500° C., a range of about 340° C. to about 500° C., a range of about 350° C. to about 500° C., a range of about 300° C. to about 490° C., a range of about 300° C. to about 480° C., a range of about 300° C. to 470° C., a range of about 300° C. to about 460° C., and a range of about 300° C. to 450° C. However, embodiments are not limited thereto. For example, the thermal treatment temperature of the first thermal treatment step may include any range of two values within each of these temperature ranges.

In some embodiments, the second thermal treatment may include thermal treatment at a temperature of about 700° C. to about 1000° C. under an atmospheric or oxidizing condition for about 5 hours to about 12 hours.

For example, the thermal treatment temperature of the second thermal treatment step may be selected from a range of about 700° C. to about 1000° C., a range of about 710° C. to about 1000° C., a range of about 720° C. to about 1000° C., a range of about 730° C. to about 1000° C., a range of about 740° C. to about 1000° C., a range of about 750° C. to about 1000° C., a range of about 700° C. to about 990° C., a range of about 700° C. to about 980° C., a range of about 700° C. to about 970° C., a range of about 700° C. to about 960° C., a range of about 700° C. to about 950° C. However, embodiments are not limited thereto. For example, the thermal treatment temperature of the second thermal treatment step may include any range of two values within each of these temperature ranges.

In some embodiments, the thermal treatment may include: a first thermal treatment step of thermally treating the precursor compound at about 300° C. to about 500° C. under an atmospheric or oxidizing condition for about 3 hours to about 5 hours to thereby obtain an intermediate compound; and a second thermal treatment step of thermally treating the intermediate compound at about 700° C. to about 1000° C. under an atmospheric or oxidizing condition for about 5 hours to about 12 hours to thereby obtain the core including the lithium transition metal oxide.

In the first thermal treatment step, synthesis of the layered cathode active material may be induced through reaction between a transition-metal-containing precursor compound and a lithium source. In the second thermal treatment step, lithium diffusion into the cobalt precursor compound may be facilitated due to a lithium concentration gradient and a high calcination temperature, and at the same time particle growth may be induced relative to that of the cobalt precursor compound, such that a single crystal phase including grown particles may be attained. The composite cathode active material obtained through the first and second thermal treatment steps may have, for example, an average particle diameter of about 0.5 μm to about 25 μm.

The mechanical mixing and the thermal treatment may be performed at the same time or sequentially. For example, after mixing the lithium transition metal oxide precursor compound and a transition metal precursor compound using a mechanical milling method, a resulting mixture may then be thermally treated within any of the above-listed temperature ranges. In some other embodiments, the mixing and the thermal treatment may be performed together at the same time in a milling device.

In some embodiments, the thermal treatment may be performed in an atmospheric or oxidizing condition. For example, the thermal treatment may be performed for about 2 hours to about 30 hours so as to sufficiently induce a diffusion reaction of the particles in the mixture.

Through the thermal treatment, a lithium-binding site in the lithium cobalt oxide or the lithium cobalt transition metal oxide may be doped with nickel (Ni). When the lithium cobalt oxide or the lithium cobalt transition metal oxide is doped with Ni, the cathode active material for a lithium secondary battery may have improved structural stability, with less concern about deterioration of the structural stability of the cathode active material for a lithium secondary battery when the cathode active material includes a defect structure, and may improve reversible capacity and output characteristics of the battery.

In some embodiments, the forming of the coating layer may include: mixing the core including the lithium transition metal oxide and a Co precursor compound to thereby prepare a mixture; and thermally treating the mixture at a temperature of about 700° C. to about 950° C. in an atmospheric or oxidizing condition for about 3 hours to about 10 hours.

In some embodiments, the forming of the coating layer may include: adding the core including the lithium transition metal oxide and a Co precursor compound into a mixer and mixing the same such that they are uniformly distributed; and then thermally treating a resulting mixture in an atmospheric or oxidizing condition.

In some embodiments, in the forming of the coating layer, the thermal treatment may be performed in a temperature range of about 800° C. to about 900° C. However, the embodiments are not limited thereto.

The core including lithium transition metal oxide and the Co precursor compound may be mixed by mechanical mixing. The mixing and the thermal treatment of the mixture may be sequentially performed. In some embodiments, the mechanical mixing and the thermal treatment may be performed at the same time. After mixing the lithium transition metal oxide and the Co precursor compound by mechanical milling, the resulting mixture may be thermally treated in the above temperature range. In some other embodiments, the mixing and the thermal treatment may be performed at the same time in a milling device.

The Co precursor compound used in the forming of the coating layer may include at least one compound selected from a cobalt-containing hydroxide, a cobalt-containing sulfate, a cobalt-containing alkoxide, a cobalt-containing oxalate, a cobalt-containing phosphate, a cobalt-containing halide, a cobalt-containing oxyhalide, a cobalt-containing sulfide, a cobalt-containing oxide, a cobalt-containing peroxide, a cobalt-containing acetate, a cobalt-containing nitrate, a cobalt-containing carbonate, a cobalt-containing citrate, a cobalt-containing phthalate, and a cobalt-containing perchlorate. For example, the Co precursor compound may include at least one compound selected from $Co_3O_4$, $Co(OH)_2$, $CoO$, $CoOOH$, $Co(OCOCH_3)_2 \cdot 4H_2O$, $Co(NO_3)_2 \cdot 6H_2O$, and $Co(SO_4)_2 \cdot 7H_2O$.

The content of the Co precursor compound may be about 0.5 parts to about 5.0 parts by weight with respect to 100 parts by weight of the lithium transition metal oxide.

A cathode including the composite cathode active material according to the one or more embodiments, and a lithium secondary battery including the cathode may be manufactured in the following manner.

First, the cathode according to one or more embodiments may be manufactured as follows.

For example, the above-described cathode active material according to one or more embodiments, a conducting agent, a binder, and a solvent may be mixed together to prepare a cathode active material composition. In some embodiments, the cathode active material composition may be directly coated on a metallic current collector to form a cathode plate. In some embodiments, the cathode active material composition may be cast on a separate support to form a cathode active material film. This cathode active material film may then be separated from the support and laminated on a metallic current collector to thereby form a cathode plate. The cathode is not limited to the examples described above, and may be any of a variety of types.

The conducting agent may be, for example, graphite such as natural graphite or artificial graphite; carbon black; conductive tubes such as carbon nanotubes; conductive whiskers such as fluorocarbon, zinc oxide, and potassium titanate; or a conductive metal oxide such as titanium oxide. However, embodiments are not limited thereto. Any conducting agent available in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, metal salts thereof, and a styrene butadiene rubber polymer. However, embodiments are not limited thereto. Any material available as a binder in the art may be used. Other examples of the binder may be, for example, lithium salts, calcium salts, or sodium salts of the above-described polymers.

The solvent may be, for example, N-methylpyrrolidone, acetone or water. However, embodiments are not limited thereto. Any solvent available in the art may be used.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, an anode may be manufactured as follows.

For example, an anode active material, a conducting agent, a binder, and a solvent may be mixed together to prepare an anode active material composition. In some embodiments, the anode active material composition may be directly coated on a metallic current collector having a thickness of about 3 μm to about 500 μm and dried to form an anode plate. In some embodiments, the anode active material composition may be cast on a separate support to form an anode active material film. This anode active material film may then be separated from the support and laminated on a metallic current collector to thereby form an anode plate.

The current collector for the anode may be any one having conductivity and not causing a chemical change to a battery. For example, the current collector for the anode may be, for example, a copper foil, a nickel foil, or a copper foil of which surface is treated with carbon.

In some embodiments, the anode active material may be any anode active material for a lithium battery available in the art. For example, the anode active material may include at least one selected from lithium metal, a metal that is alloyable with lithium, a transition metal oxide, a non-transition metal oxide, and a carbonaceous material.

Examples of the metal alloyable with lithium may be Si, Sn, Al, Ge, Pb, Bi, Sb, a Si—Y alloy (where the element Y is an alkali metal, an alkali earth metal, a Group 13 element, a Group 14 element, a transition metal, a rare earth element, or a combination thereof, and Y is not Si), and a Sn—Y alloy (where the element Y is an alkali metal, an alkali earth metal, a Group 13 element, a Group 14 element, a transition metal, a rare earth element, or a combination thereof, and Y is not Sn). In some embodiments, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), or tellurium (Te).

For example, the transition metal oxide may be a lithium titanium oxide, a vanadium oxide, or a lithium vanadium oxide.

For example, the non-transition metal oxide may be $SnO_2$ or $SiO_x$ (wherein $0<x<2$).

The carbonaceous material may be, for example, crystalline carbon, amorphous carbon, or a mixture thereof. Examples of the crystalline carbon may be graphite, such as natural graphite or artificial graphite that are in shapeless, plate, flake, spherical, or fibrous form. Examples of the amorphous carbon may be soft carbon (carbon sintered at low temperatures), hard carbon, meso-phase pitch carbides, and sintered cokes.

In some embodiments, the conducting agent, the binder, and the solvent used for the anode active material composition may be the same as those used for the cathode active material composition.

The amounts of the anode active material, the conducting agent, the binder, and the solvent may be the same levels generally used in the art for lithium batteries. At least one of the conducting agent, the binder, and the solvent may be omitted according to the use and the structure of the lithium battery.

Next, a separator that is to be disposed between the cathode and the anode may be prepared as follows.

The separator for the lithium battery may be any separator that is commonly used in lithium batteries. The separator may have low resistance to migration of ions in an electrolyte and have an excellent electrolyte-retaining ability. In some embodiments, the separator may be a single layer or a multilayer. Examples of the separator may be glass fiber, polyester, Teflon, polyethylene, polypropylene, polytetrafluoroethylene (PTFE), and a combination thereof, each of which may be in the form of a non-woven or woven fabric. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. For example, a rollable separator including polyethylene or polypropylene may be used for a lithium ion battery. A separator with a good organic electrolyte-retaining ability may be used in a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to thereby form the separator. In some embodiments, the separator composition may be cast on a support and then dried to form a separator film, which may then be separated from the support and laminated on an electrode to thereby form the separator.

The polymer resin used to manufacture the separator may be any material that is commonly used as a binder for electrode plates. Examples of the polymer resin may be a vinylidenefluoride/hexafluoropropylene copolymer, polyvinylidene fluoride (PVDF), polyacrylonitrile, polymethylmethacrylate, and a mixture thereof.

Next, an electrolyte may be prepared as follows.

In some embodiments, the electrolyte may be an organic liquid electrolyte. In some embodiments, the electrolyte may be in a solid phase. Examples of the electrolyte may be lithium oxide and lithium oxynitride. Any material available as a solid electrolyte in the art may be used. In some embodiments, the solid electrolyte may be formed on the anode by, for example, sputtering.

In some embodiments, the organic liquid electrolyte may be prepared by dissolving a lithium salt in an organic solvent.

The organic solvent may be any solvent available as an organic solvent in the art. Examples of the organic solvent may be cyclic carbonates, such as propylene carbonate, ethylene carbonate, fluoroethylene carbonate, butylene carbonate, and vinylene carbonate; chain carbonates such as dimethylcarbonate, diethylcarbonate, methylethyl carbonate, methylpropyl carbonate, ethylpropyl carbonate, methylisopropyl carbonate, dipropyl carbonate, and dibutyl carbonate; esters, such as methyl acetate, ethyl acetate, propyl acetate, methyl propionate, ethyl propionate, and γ-butyrolactone; ethers, such as 1,2-dimethoxyethane, 1,2-diethoxyethane, tetrahydrofuran, 1,2-dioxane, and 2-methyltetrahydrofuran; nitriles such as acetonitrile; and amides such as dimethyl formamide. These examples of the organic solvent may be used alone or in combination. For example, the organic solvent may be a mixed solvent of a cyclic carbonate and a chain carbonate.

In some other embodiments, the electrolyte may be a gel type polymer electrolyte which may be obtained by impregnating a polymer electrolyte such as polyethylene oxide or polyacrylonitrile with a liquid electrolyte, or an inorganic solid electrolyte such as LiI, $Li_3N$, $Li_xGe_yP_zS_\alpha$, or $Li_xGe_yP_zS_\alpha X_\delta$ (wherein X may be F, Cl, or Br).

In some embodiments, the lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Figure 9:
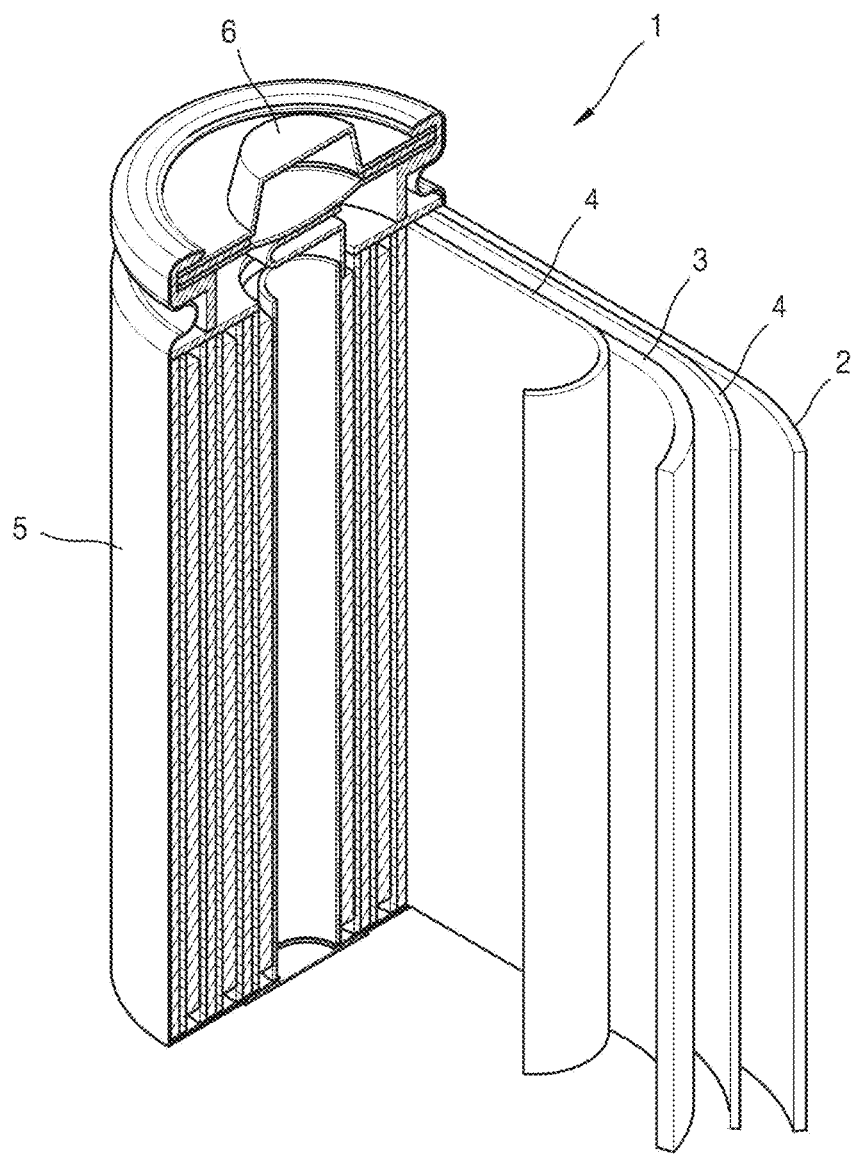
FIG. 9 is a schematic view of a lithium secondary battery according to an example embodiment.

Referring to FIG. 9, a lithium battery 1 according to an embodiment may include a cathode 3, an anode 2, and a separator 4. The cathode 3, the anode 2, and the separator 4 may be wound or folded, and then accommodated in a battery case 5. Then, after an organic liquid electrolyte is injected into the battery case 5, the battery case 5 may then be sealed with a cap assembly 6, thereby completing the manufacture of the lithium battery 1. The battery case 5 may be, for example, a cylindrical type, a rectangular type, or a thin-film type. For example, the lithium battery 1 may be a thin-film type battery. The lithium battery 1 may be, for example, a lithium ion battery.

In some embodiments, the separator may be disposed between the cathode and the anode to form a battery assembly. In some embodiments, the battery assembly may be stacked to form a bi-cell structure, which may then be impregnated with the organic liquid electrolyte. The resulting battery assembly structure may be put into a pouch and hermetically sealed, to thereby manufacture a lithium ion polymer battery.

In some embodiments, a plurality of battery assemblies may be stacked on one another to form a battery pack. This battery pack may be used in any device that requires high capacity and high output, for example, in a laptop computer, a smart phone, or an electric vehicle.

The lithium battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

EXAMPLES (Preparation of Cathode Active Material)

Example 1

20 g of $Co_3O_4$, 9.718 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then at about 1000° C. for about 8 hours, to thereby synthesize a lithium transition metal oxide with a mole ratio of Li/(Co+Ni) of about 1.00, a Ni mole ratio of about 0.05, and a total mole ratio of Ti and Mg of about 0.005.

Example 2

20 g of $Co_3O_4$, 10.107 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then at about 1000° C. for about 8 hours, to thereby synthesize a lithium transition metal oxide with a mole ratio of Li/(Co+Ni) of about 1.04, a Ni mole ratio of about 0.05, and a total mole ratio of Ti and Mg of about 0.005.

Example 3

20 g of $Co_3O_4$, 9.718 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then at about 970° C. for about 8 hours, to thereby synthesize a lithium transition metal oxide with a mole ratio of Li/(Co+Ni) of about 1.00, a Ni mole ratio of about 0.05, and a total mole ratio of Ti and Mg of about 0.005.

Example 4

20 g of $Co_3O_4$, 10.107 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then at about 970° C. for about 8 hours, to thereby synthesize a lithium transition metal oxide with a mole ratio of Li/(Co+Ni) of about 1.04, a Ni mole ratio of about 0.05, a total mole ratio of Ti and Mg of about 0.005.

Example 5

20 g of $Co_3O_4$, 9.912 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then at about 970° C. for about 8 hours, to thereby synthesize a lithium transition metal oxide with a mole ratio of Li/(Co+Ni) of about 1.02, a Ni mole ratio of about 0.05, a Ti mole ratio of about 0.002, and a Mg mole ratio of about 0.003.

Example 6

20 g of the lithium transition metal oxide obtained in Example 5 was put into a Retsch ZM-200 mill, grinded, and then passed through a 25-um sieve to collect powder of a size. The collected lithium transition metal oxide and 0.244 g of a cobalt precursor ($Co(OH)_2$) were uniformly distributed with a planetary mixer Thinky ARE-310. The dispersed powder was calcined under an atmospheric condition at about 900° C. for about 5 hours, to thereby obtain a composite cathode active material having, on a surface thereof, a coating layer including a cobalt compound.

Example 7

20 g of $Co_3O_4$, 9.718 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/(Co+Ni) of about 1.000, a Ni mole ratio of about 0.05, a Ti mole ratio of about 0.002, and an Mg mole ratio of about 0.003.

Example 8

20 g of $Co_3O_4$, 9.815 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/(Co+Ni) of about 1.010, a Ni mole ratio of about 0.05, a Ti mole ratio of about 0.002, and a Mg mole ratio of about 0.003.

Example 9

20 g of $Co_3O_4$, 9.912 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/(Co+Ni) of about 1.020, a Ni mole ratio of about 0.05, a Ti mole ratio of about 0.002, and a Mg mole ratio of about 0.003.

Next, 20 g of the obtained lithium transition metal oxide and 0.244 g of a cobalt precursor ($Co(OH)_2$) were put into a planetary Thinky ARE-310 mixer and then uniformly mixed at about 2,000 rpm for about 10 minutes. The mixed powder was calcined at about 900° C. for about 5 hours, to thereby obtain a composite cathode active material having, on a surface thereof, a coating layer including a cobalt compound.

Example 10

20 g of $Co_3O_4$, 9.912 g of $Li_2CO_3$, 1.215 g of $Ni(OH)_2$, 0.042 g of $TiO_2$, and 0.079 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/(Co+Ni) of about 1.020, a Ni mole ratio of about 0.05, a Ti mole ratio of about 0.002, and a Mg mole ratio of about 0.003.

Next, 20 g of the obtained lithium transition metal oxide and 0.244 g of a cobalt precursor ($Co(OH)_2$) were put into a planetary Thinky ARE-310 mixer and then uniformly mixed at about 2,000 rpm for about 10 minutes. The mixed powder was calcined at about 900° C. for about 5 hours, to thereby obtain a composite cathode active material having, on a surface thereof, a coating layer including a cobalt compound.

Example 11

20 g of $Co_3O_4$, 10.127 g of $Li_2CO_3$, 1.738 g of $Ni(OH)_2$, 0.043 g of $TiO_2$, and 0.081 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of 0.070, a Ti mole ratio of about 0.002, and an Mg mole ratio of about 0.003.

Example 12

20 g of $Co_3O_4$, 10.127 g of $Li_2CO_3$, 2.008 g of $Ni(OH)_2$, 0.044 g of $TiO_2$, and 0.082 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.080, a Ti mole ratio of about 0.002, and a Mg mole ratio of about 0.003.

Example 13

20 g of $Co_3O_4$, 10.466 g of $Li_2CO_3$, 2.566 g of $Ni(OH)_2$, 0.045 g of $TiO_2$, and 0.084 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.100, a Ti mole ratio of about 0.002, and an Mg mole ratio of about 0.003.

Example 14

20 g of $Co_3O_4$, 10.489 g of $Li_2CO_3$, 2.571 g of $Ni(OH)_2$, 0.089 g of $TiO_2$, and 0.084 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.100, a Ti mole ratio of about 0.004, and an Mg mole ratio of about 0.003.

Example 15

20 g of $Co_3O_4$, 10.525 g of $Li_2CO_3$, 2.580 g of $Ni(OH)_2$, 0.112 g of $TiO_2$, and 0.140 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of 0.100, a Ti mole ratio of about 0.005, and an Mg mole ratio of about 0.005.

Example 16

20 g of $Co_3O_4$, 10.525 g of $Li_2CO_3$, 2.580 g of $Ni(OH)_2$, and 0.280 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.100 and an Mg mole ratio of about 0.01.

Example 17

20 g of $Co_3O_4$, 10.644 g of $Li_2CO_3$, 2.609 g of $Ni(OH)_2$, and 0.567 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of 0.100 and an Mg mole ratio of about 0.02.

Example 18

20 g of $Co_3O_4$, 10.525 g of $Li_2CO_3$, 2.580 g of $Ni(OH)_2$, and 0.224 g of $TiO_2$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.100 and a Ti mole ratio of about 0.01.

Example 19

20 g of $Co_3O_4$, 10.644 g of $Li_2CO_3$, 2.609 g of $Ni(OH)_2$, and 0.454 g of $TiO_2$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a Ni mole ratio of about 0.100 and a Ti mole ratio of about 0.02.

Comparative Example 1

20 g of $Co_3O_4$, 9.599 g of $Li_2CO_3$, 0.04 g of $TiO_2$, and 0.075 g of $MgCO_3$ were uniformly mixed with a planetary mixer Thinky ARE-310 for about 15 minutes. The mixed powder was thermally treated at about 450° C. for about 1 hour, and then calcined at about 1000° C. for about 8 hours, to thereby synthesize a lithium transition metal oxide with a mole ratio of Li/Co of about 1.040 and a total mole ratio of Ti and Mg of about 0.005.

Comparative Example 2

20 g of $Co_3O_4$, 9.599 g of $Li_2CO_3$, 0.04 g of $TiO_2$, and 0.075 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/Co of about 1.040 and a total mole ratio of Ti and Mg of about 0.005.

Comparative Example 3

20 g of $Co_3O_4$, 9.414 g of $Li_2CO_3$, 0.04 g of $TiO_2$, and 0.075 g of $MgCO_3$ were uniformly mixed with a planetary mixer Thinky ARE-310 for about 15 minutes. The mixed powder was thermally treated at about 450° C. for about 1 hour, and then calcined at about 970° C. for about 8 hours, to thereby synthesize a lithium transition metal oxide with a mole ratio of Li/Co of about 1.020 and a total mole ratio of Ti and Mg of about 0.005.

Comparative Example 4

20 g of the lithium transition metal oxide obtained in Comparative Example 3 was put into a Retsch ZM-200 mill, grinded, and then passed through a 25-um sieve to collect powder of a size. The collected lithium transition metal oxide and 0.244 g of a cobalt precursor ($Co(OH)_2$) were uniformly distributed with a planetary mixer Thinky ARE-310. The dispersed powder was calcined under an atmospheric condition at about 900° C. for about 5 hours, to thereby obtain a composite cathode active material having, on a surface thereof, a coating layer including a cobalt compound.

(Manufacturing of Half Cell)

Example 20

The cathode active material prepared in Example 5, a conducting agent, and a binder were mixed in a weight ratio of about 91:5:4 to prepare a slurry. The conducting agent used was Super-P, and the binder used was about 6 wt % of 9300 polyvinylidene fluoride (PVdF).

After the slurry was uniformly applied onto an aluminum (Al) current collector, dried, and then roll-pressed, further drying was performed to thereby manufacture a cathode. A loading level of the electrode plate was about 15.2 mg/cm$^2$, and an electrode density after the pressing was about 3.7 g/cc to about 3.8 g/cc.

By using the manufactured cathode as a working electrode, a lithium foil as a counter electrode, a polyethylene membrane disposed as a separator between the cathode and the counter electrode, and a liquid electrolyte prepared by adding 1.0M $LiPF_6$ as a lithium salt to a mixed solvent of EC/EMC/DEC in a volume ratio of about 1:2:1, a CR2032 half cell was manufactured according to a commonly known process.

Examples 21 to 34 and Comparative Examples 5 to 7

Half cells were manufactured in the same manner as in Example 20, except that the cathode active materials prepared in Examples 6 to 19 and Comparative Examples 2 to 4 were used, respectively, instead of the cathode active material of Example 5.

Evaluation Example 1 (SEM, TEM, and STEM Analysis)

Particle diameters of the lithium transition metal oxides prepared in Examples 1 to 4 and Comparative Examples 1 and 2 were analyzed using a Clias 1090 particle size analyzer (Scinco). The results are shown in Table 1. Scanning electron microscope (SEM) images of the lithium transition metal oxides are shown in FIG. 1.

TABLE 1

|  | Comparative Example 1 | Comparative Example 2 | Example 1 | Example 2 | Example 3 | Example 4 |
|---|---|---|---|---|---|---|
| D10 (μm) | 11.22 | 3.33 | 8.60 | 9.88 | 3.88 | 6.2 |
| D50 (μm) | 21.27 | 5.30 | 16.90 | 18.56 | 6.90 | 14.20 |
| D90 (μm) | 38.65 | 8.50 | 28.45 | 30.44 | 10.52 | 21.20 |
| PD (g/cc) | 4.1 | 3.78 | 4.02 | 4.01 | 3.88 | 3.9 |

Referring to Table 1, it was found that the lithium transition metal oxides of Comparative Example 1 and Examples 1 and 2 had a similar particle size distribution, and the lithium transition metal oxides of Comparative Example 2 and Examples 3 and 4 had a similar particle size distribution. Accordingly, the lithium transition metal oxides of Examples 1 to 4 were expected to have crystals similar to a single-crystal lithium cobalt oxide.

Referring to FIG. 1, the lithium transition metal oxides of Example 1, Example 2, and Comparative Example 1 were found to have similar particle shapes, as shown in the SEM images.

Figure 2:
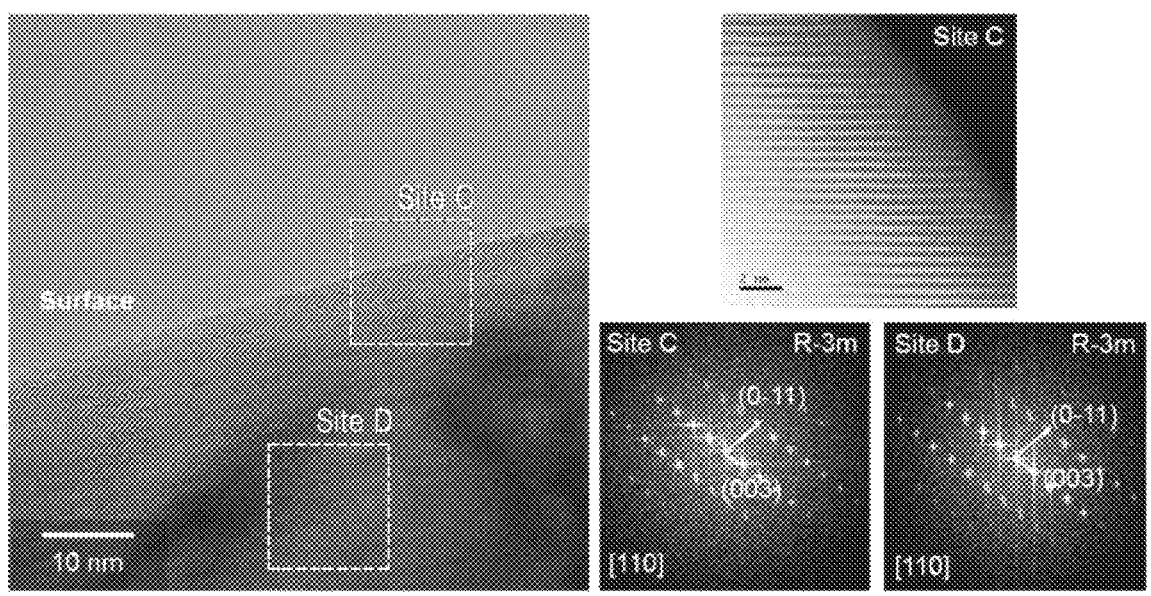
FIG. 2 shows high-resolution transmission electron microscope (HR-TEM) and fast Fourier transformation (FFT) images of a cathode active material prepared in Example 5.
Figure 3:
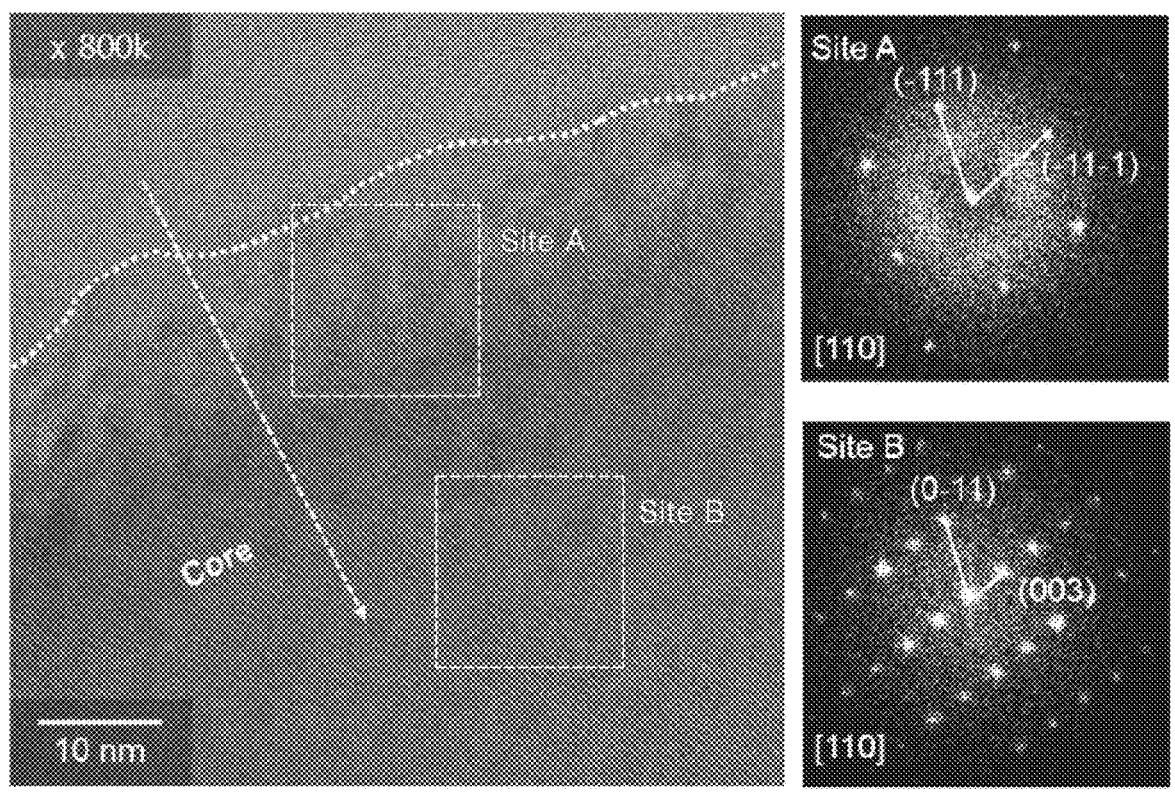
FIG. 3 shows HR-TEM and FFT images of a cathode active material prepared in Example 6.

The results of high-resolution transmission electron microscopy (HR-TEM) and fast Fourier transformation (FFT) analysis on the lithium transition metal oxides of Example 5 and Example 6 are shown in FIGS. 2 and 3.

The lithium transition metal oxides of Example 5 and Example 6 were different in whether or not having a cobalt coating layer. Referring to FIGS. 2 and 3, the lithium transition metal oxide of Example 5 was observed to have a single pattern of a layered structure, as analyzed by electron diffraction (ED) and FFT analysis, as the constituent atoms of the lithium transition metal oxide of Example 5 are oriented in one direction.

The composite cathode active material of Example 6 was found to have a rock salt structure (Fm-3m) having a thickness of about 5 nm to about 10 nm, locally up to about 50 nm at maximum, in a single-particle surface region thereof. The composite cathode active material of Example 6 was found to have layered structures mainly due to a gradient degree of occupation of a transition metal in a Li+ layer, gradually decreasing toward the core of the cathode active material.

Evaluation Example 2 (Electrochemical Characteristics)

After a rest period of about 10 hours, the half cells manufactured in Examples 20 to 23 and Comparative Examples 5 to 7 were each charged in a constant current (CC) mode at about 0.1 C until a voltage of about 4.45V was reached and then in a constant voltage (CV) mode until a current corresponding to 0.05 C was reached, and then discharged in a CC mode at about until a voltage of about 3.0V was reached. To evaluate room-temperature lifetime, each half cell was charged in a CC mode at about 0.5 C until a voltage of about 4.45V was reached and then in a CV mode until a current corresponding to 0.05 C was reached, and then discharged in a CC mode at about 1 C until a voltage of about 3.0V was reached. This cycle was repeated 100 times in total.

Figure 4:
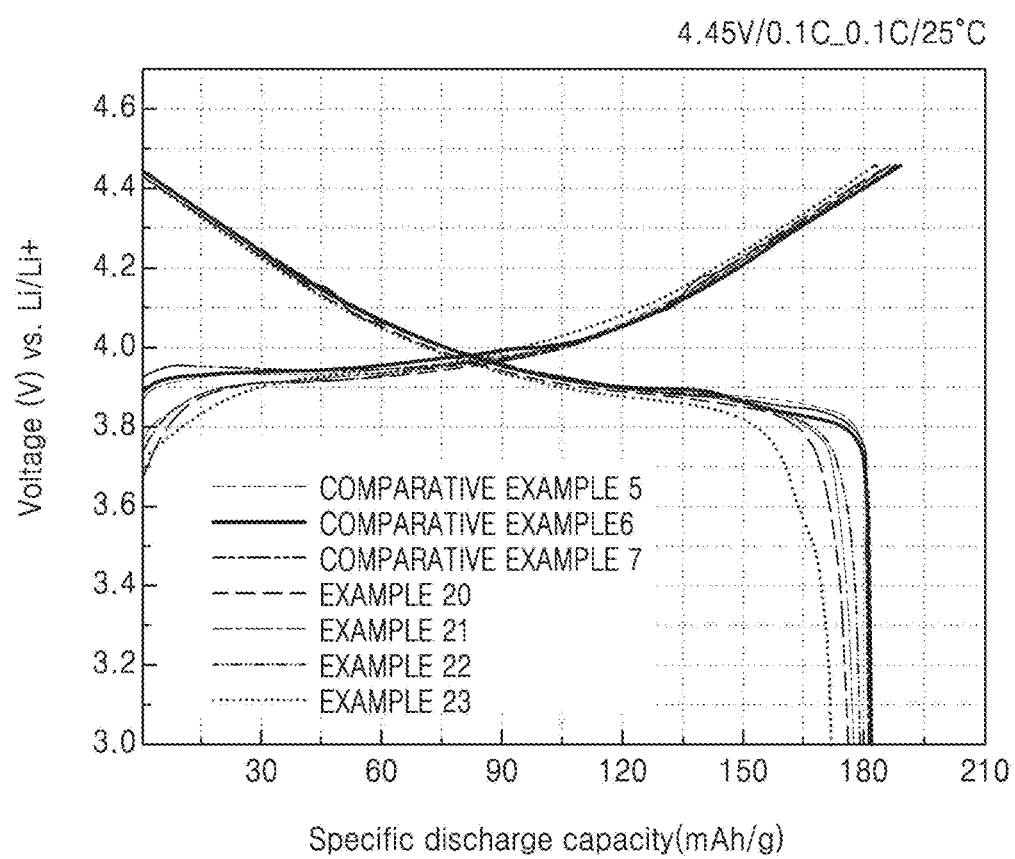
FIG. 4 is a graph illustrating charge and discharge curves of half cells of Examples 20 to 23 and Comparative Examples 5 to 7.

The results are shown in Table 2 and FIG. 4.

TABLE 2

| $Li_xCo_{1-y-z}Ni_yM1_zO_2$ (Y = 0.05, Z = 0.002Ti + 0.003 Mg) Li:(Co + Ni) = A 1.0 ≤ A ≤ 1.04 | room-temperature cycle | |
|---|---|---|
| | Formation capacity (mAh/g) | Initial Coulombic efficiency (%) |
| Comparative Example 5 | 182 | 97.3 |
| Comparative Example 6 | 182 | 96.4 |
| Comparative Example 7 | 182 | 97.8 |
| Example 20 (A = 1.020) | 176 | 94.6 |
| Example 21 (A = 1.020) | 177 | 94.4 |
| Example 22 (A = 1.020) | 179 | 95.2 |
| Example 23 (A = 1.020) | 172 | 95.1 |

Referring to Table 2 and FIG. 4, the half cells of Comparative Examples 5 to 7, using the cathode active materials not doped with Ni, were found to have a difference in formation capacity ranging from as low as about 3 mAh/g to as much as about 10 mAh/g, with respect to the half cells of Examples 20 to 23. Overall, the half cells of Examples 20 to 23 had a lower initial Coulombic efficiency of about 94%, compared to the half cells of Comparative Examples 5 to 7.

A high-voltage characteristic evaluation was performed on the half cells manufactured in Examples 28 to 34 and Comparative Example 7 under the same conditions as in the room-temperature lifetime evaluation, except that the charging cut-off voltage was changed to 4.6V. This high-voltage characteristic evaluation was repeated 10 times in total. To evaluate high-temperature (60° C.) lifetime, after a rest period in a 60° C. high-temperature chamber for about 10 hours, each assembled cell was charged in a CC mode at about 0.1 C until a voltage of about 4.30V was reached and then in a CV mode until a current corresponding to 0.05 C was reached, and then discharged in a CC mode at about 0.1 C until a voltage of about 3.0V was reached. Next, each cell was charged in a CC mode at about 0.5 C until a voltage of about 4.30V was reached and then in a CV mode until a current corresponding to 0.05 C was reached, and then discharged in a CC mode at about 1 C until a voltage of about 3.0V was reached. This cycle was repeated 200 times in total.

Figure 8:
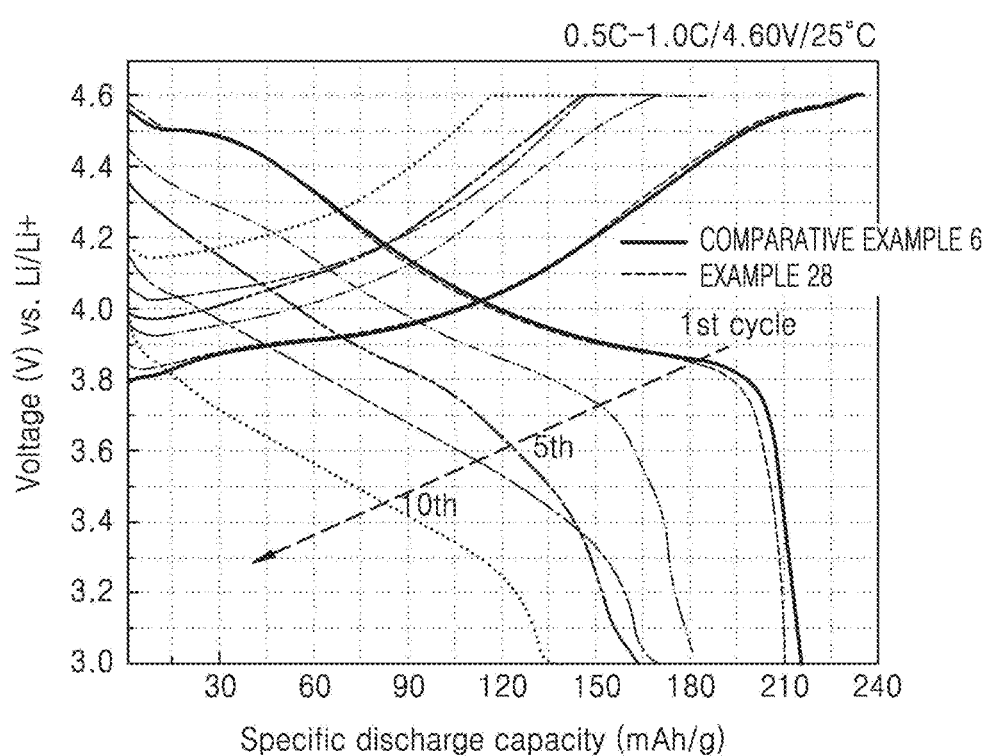
FIG. 8 is a graph of charge and discharge curves for the initial 10 cycles of the half cells of Example 28 and Comparative Example 6.

The results are shown in Table 3 and FIG. 8.

TABLE 3

| | 4.6V room-temperature cycle | | | | | | | |
|---|---|---|---|---|---|---|---|---|
| | | $Li_xCo_{1-y-z}Ni_yM1_zO_2$ (Y = 0.1) | | | | | | |
| | LiCoO$_2$ Comparative Example 6 Z = 0.005 (Z = 0.002 Ti & 0.003 Mg) | Example 28 Z = 0.005 (Z = 0.002 Ti & 0.003 Mg) | Example 29 Z = 0.007 (Z = 0.004 Ti & 0.003 Mg) | Example 30 Z = 0.01 (Z = 0.005 Ti & 0.005 Mg) | Example 31 Mg = 0.01 | Example 32 Mg = 0.02 | Example 33 Ti = 0.01 | Example 34 Ti = 0.02 |
| 1$^{st}$ cycle | 215 | 210 | 207 | 206 | 200 | 197 | 201 | 194 |
| 5$^{th}$ cycle | 170 | 181 | 179 | 177 | 164 | 157 | 166 | 158 |
| 10$^{th}$ cycle | 138 | 163 | 155 | 154 | 146 | 134 | 145 | 132 |
| Cycle retention @ 10$^{th}$ cycle | 64.2% | 77.6% | 75.2% | 74.8% | 73.1% | 68.2% | 72.1% | 68.0% |

Referring to Table 3 and FIG. 8, the half cell of Example 28, including the lithium transition metal oxide to which a trace amount of additional doping elements (0.002 Ti+0.005 Mg) corresponding to z=0.005 was added along with Ni, was found to have a high lifetime retention due to improved phase stability in a high-voltage environment, compared to the half cell of Comparative Example 6. The half cells of Examples 28 to 34 were found to have different effects depending on a combination of at least two of Ti, Mg, Al, and Zr, but have in common an improved lifetime retention in an Ni-doped condition, compared with the half cell of Comparative Example 6, indicating that doping at least two elements of Ti, Mg, Al, and Zr together with Ni is advantageous in improving high-voltage and long-term cycle performances.

Evaluation Example 3 (Lifetime Characteristic Evaluation)

The half cells manufactured in Examples 20, 21, 24, and 25, and Comparative Examples 6 and 7 were each charged at room temperature in a CC mode at about 0.5 C in the same voltage range as applied in the formation process, until a voltage of about 4.45V was reached, and then in a CV mode until a current corresponding to 0.05 C was reached, and then discharged in a CC mode at about 1.0 C until a voltage of about 3.0V was reached.

Figure 5:
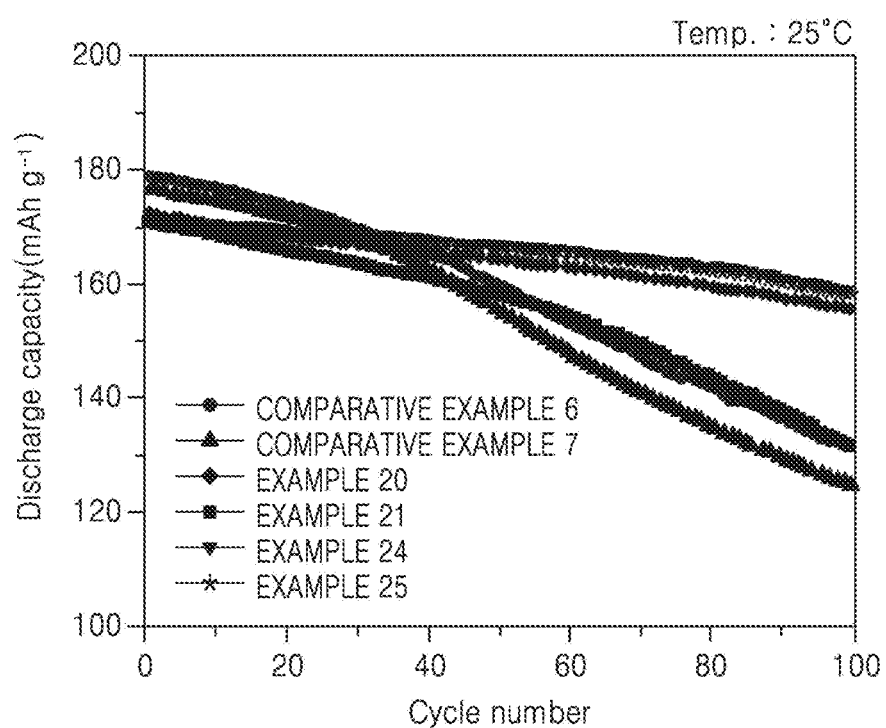
FIG. 5 is a graph of discharge capacity with respect to the number of charging and discharging cycles at room temperature of the half cells of Examples 20 and 21 and Comparative Examples 6 and 7, and half cells of Examples 24 and 25.
Figure 6:
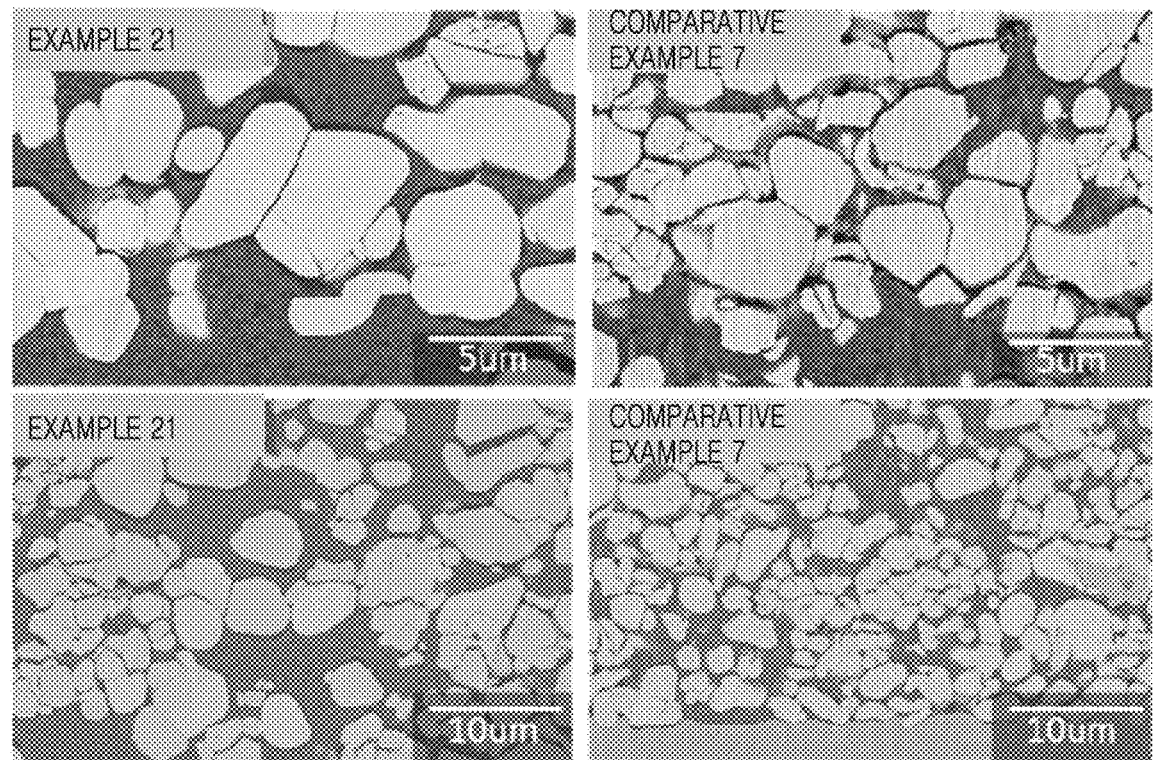
FIG. 6 shows SEM images of cathode cross-sections and surfaces after charging and discharging cycles at room temperature of the half cells of Example 21 and Comparative Example 7.
Figure 6:
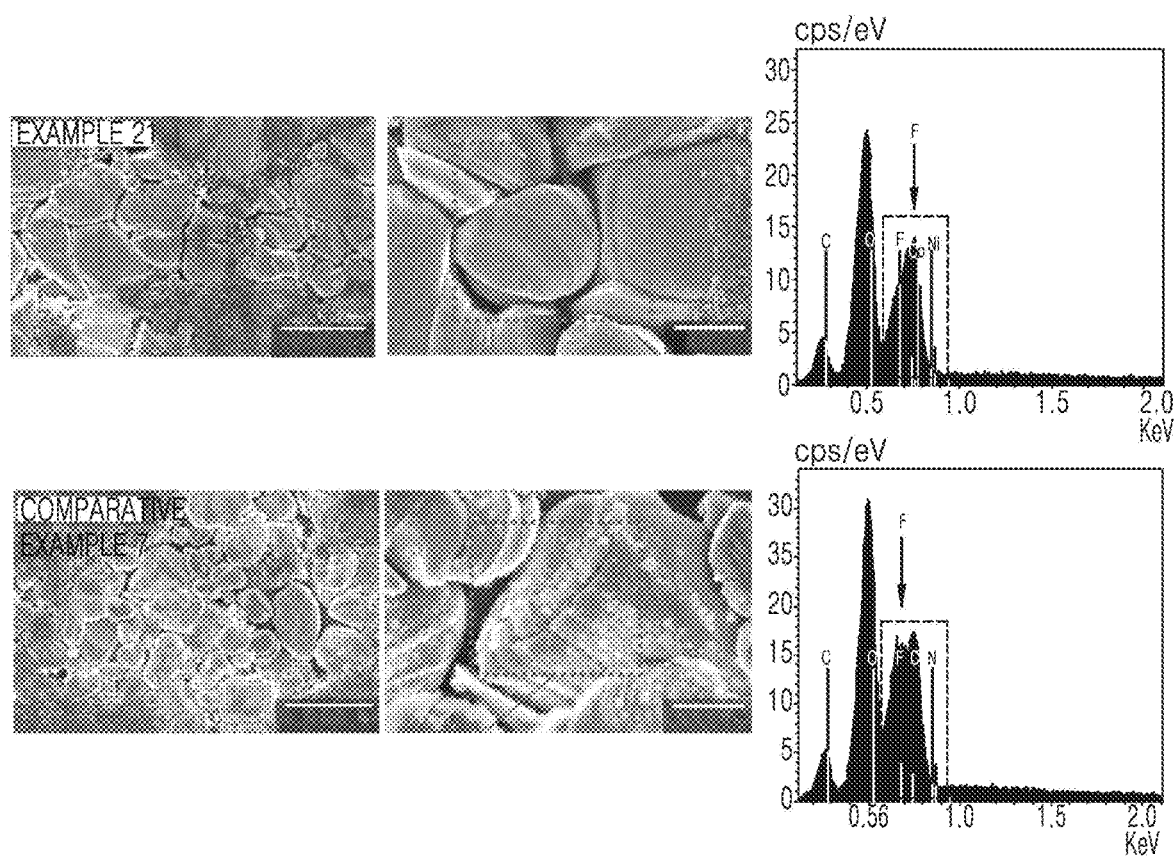

The results are shown in Table 4 and FIG. 5.

TABLE 4

$Li_xCo_{1-y-z}Ni_yM1_zO_2$
(Y = 0.05,

| Z = 0.002Ti + 0.003 Mg) Li:(Co + Ni) = A 1.0 ≤ A ≤ 1.04 | $Co(OH)_2$ coating weight | formation capacity (mAh/g) | Room-temperature lifetime $100^{th}$ cycle lifetime retention (%) |
|---|---|---|---|
| Comparative Example 6 | 0 wt % | 179 | 73.1 |
| Comparative Example 7 | 2 wt % | 177 | 72.5 |
| Example 20 (A = 1.020) | 0 wt % | 172 | 76.6 |
| Example 21 (A = 1.020) | 2 wt % | 172 | 90.7 |
| Example 24 (A = 1.020) | 4 wt % | 171 | 91.9 |
| Example 25 (A = 1.020) | 5 wt % | 172 | 92.4 |

Referring to Table 4 and FIG. 5, as a result of room-temperature lifetime evaluation, the half cells of Examples 20 to 25 using the Ni-doped cathode active materials of Formula 1 were found to retain a higher cycle lifetime efficiency during initial 100 cycles, compared to the half cells of Comparative Examples 6 and 7 using the non-Ni doped cathode active materials initial 100 cycles. The half cell of Example 20 using the cathode active material coated with about 2 wt % to about 5 wt % of $Co(OH)_2$ was found to have a further improved lifetime retention. This is attributed to that partial reduction of the doped Ni from $Ni^{3+}$ to $Ni^{2+}$ inhibited side reactions in the cathode active material-electrolyte interface.

To evaluate high-temperature lifetime characteristics, each of the half cells was charged at a high temperature (60° C.) in a constant current (CC) mode at 0.5 C in the same voltage range as in the formation process until a voltage of 4.30V was reached, and then in a constant voltage (CV) mode until a current corresponding to 0.05 C was reached, followed by discharging in a CC mode at 1.0 C until a voltage of about 3.0V was reached.

Figure 7:
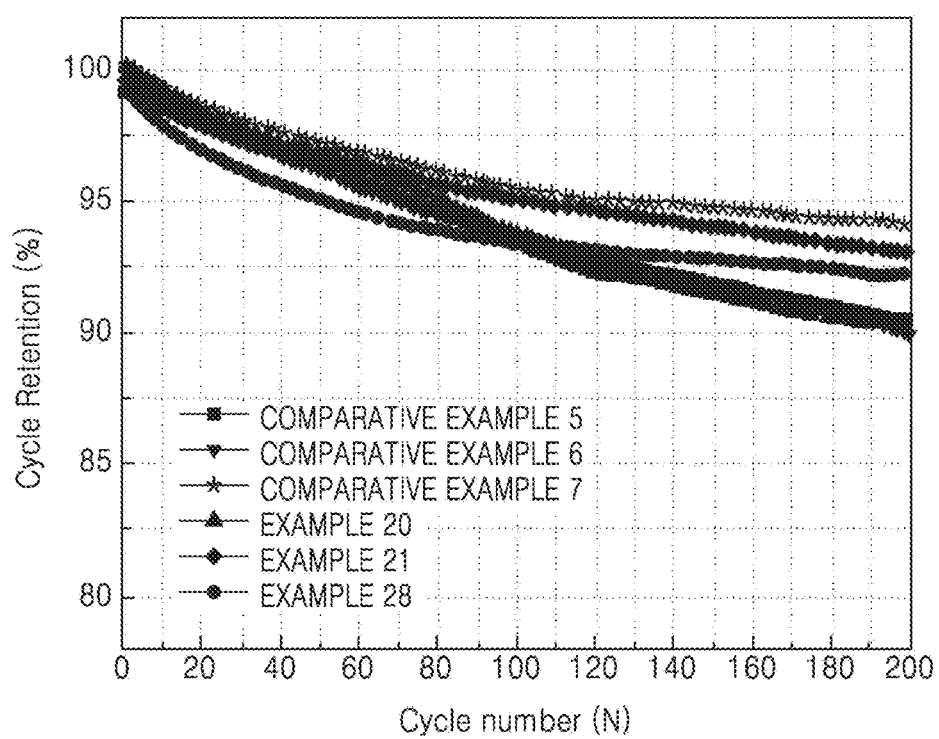
FIG. 7 is a graph of cycle retention with respect to the number of charging and discharging cycles at a high temperature of the half cells of Examples 20 and 21 and Comparative Examples 5 to 7, and a half cell of Example 28.

The results are shown in Table 5 and FIG. 7.

TABLE 5

$Li_xCo_{1-y-z}Ni_yM1_zO_2$
doped Ni mol

| (0.05 ≤ Y ≤ 0.1, Z = 0.002Ti & 0.003 Mg) | Formation capacity (mAh/g) | 60° C. cycle $200^{th}$ cycle retention (%) |
|---|---|---|
| Comparative Example 5 | 162 | 90.4 |
| Comparative Example 6 | 159 | 89.8 |
| Comparative Example 7 | 159 | 93.3 |
| Example 20 | 158 | 90.9 |
| Example 21 | 155 | 92.8 |
| Example 26  Y = 0.070 | 156 | 91.1 |
| Example 27  Y = 0.080 | 157 | 92.2 |
| Example 28  Y = 0.100 | 156 | 92.2 |

As a result of the high-temperature lifetime evaluation, the half cells of Example 20, 21, 26 to 28 were found to have a similar lifetime retention, compared to the half cells of Comparative Examples 5 to 7. Generally, Ni-rich cathode active materials which undergo a sharp deterioration in lifetime at high temperature, the half cells of Example 20, 21, 26 to 28 using the Ni-doped cathode active materials exhibited a similar degree of lifetime deterioration to the half cells of Comparative Examples 5 to 7 using the non-Ni-doped cathode active materials. In consideration of a remarkably high lifetime efficiency at room temperature as described above, coating a trace amount of Ni and a Co precursor to prepare a cathode active material as used in Examples 20, 21, 26 to 28 is found to be quite effective.

Evaluation Example 4 (Cathode Surface Evaluation after Room-Temperature Lifetime Evaluation)

After the room-temperature lifetime evaluation, surfaces of cathodes used in Example 21 and Comparative Example 7 were evaluated. As a result of the cathode surface evaluation, a small amount of a F-containing reaction product resulting from the side reaction between the cathode and the electrolyte was detected in the cathode surface of the half cell of Example 21, indicating reduced surface reactivity of the cathode.

After the room-temperature lifetime evaluation, a cross-section of the cathode used in Example 21 was evaluated. As a result of the cross-section evaluation, the particle shape of the cathode active material was maintained, as before the cycles, at a high electrode density (~3.7 g/cc to 3.8 g/cc). Accordingly, a lifetime deterioration problem with a secondary-particle-type cathode active material, in which micro-cracking inside the particles generates newly exposed electrode/electrolyte interfaces such as to accelerate side reactions with a liquid electrolyte and structural changes, which is recognized as a major deterioration mechanism, may be resolved by introducing the monocrystalline cathode active material for a lithium secondary battery.

As described above, the composite cathode active material according to the one or more embodiments prepared using a solid phase synthesis method may have a single crystal phase, which may be durable under a high-press condition during a cathode manufacturing process, and may consequently implement a high electrode density and a high energy density (wh/cc), compared to conventional Ni-rich or Li-rich cathode active materials synthesized using a co-precipitation method. Furthermore, the composite cathode active material according to the one or more embodiments may undergo less cracking than that occur in secondary particles during repeated, continuous charging and discharging cycles, and may prevent side reactions resulting from additional exposed interfaces.

In view of an average discharge voltage, which is a factor affecting a cathode energy density, a lithium cobalt oxide material (3.9 V) is advantageous over a Ni-rich (3.8 V) or Li-rich material (3.6 V). Accordingly, a Ni-doped $LiCoO_2$ material according to an embodiment including Co as a highest-content transition metal may also be advantageous in terms of discharge voltage.

Furthermore, Ni ions present in an initial transition metal layer immediately after the synthesis of a composite cathode active material may migrate to a Li-ion layer while charging and discharging processes, through partial cation-mixing. The Ni ions that have moved into the Li-ion layer may partially offset an electrostatic repelling force between anions (oxygen ions) and relieve irreversible O1/O2 phase transition, regarded as a cause of the low reversible capacity of lithium cobalt oxide, thus improving structural stability and lifetime characteristics. When $Co(OH)_2$ is coated on a cathode active material by solid-phase coating, lifetime performance at high voltage may be improved, compared to when $LiCoO_2$ having the same crystal structure as $Co(OH)_2$ is used.

While one or more embodiments have been described with reference to the appended drawings, it will be understood by those of ordinary skill in the art that various changes in form and details may be made therein without departing from the spirit and scope as defined by the following claims. Therefore, the scope of the disclosure is defined not by the detailed description of the disclosure but by the appended claims.

The invention claimed is:

1. A composite cathode active material comprising:
a core comprising a lithium transition metal oxide represented by Formula 3 and having a layered crystalline phase belonging to the Space Group R-3m; and
a coating layer on a surface of the core, the coating layer comprising a cobalt compound:

$$Li_xCo_{1-y-q-r}Ni_yM3_qM4_rO_2 \qquad \text{<Formula 3>}$$

wherein, in Formula 3, 1.00≤x≤1.04, 0.05≤y≤0.1, 0<q<0.005, 0<r<0.005, 0.001≤q+r≤0.007, and M3 and M4 are different from one another and are each independently selected from magnesium (Mg), and titanium (Ti).

2. The composite cathode active material of claim 1, wherein the core comprising the lithium transition metal oxide is a single crystal, and the Ni is located at an octahedral site in the single crystal.

3. The composite cathode active material of claim 1, wherein a content of Co in M1 in the lithium transition metal oxide represented by Formula 1 is the largest among the elements in M1.

4. The composite cathode active material of claim 1, wherein a ratio of moles of Li to total moles of Co and Ni (Li/(Co+Ni)) in the lithium transition metal oxide satisfies 1≤Li/(Co+Ni)≤1.04.

5. The composite cathode active material of claim 1, wherein a rock salt structure is on a surface of the core, the rock salt structure having a thickness of about 5 nm to about 10 nm and belonging to the Space Group Fm-3m.

6. The composite cathode active material of claim 1, wherein the core of the composite cathode active material has an average particle diameter of about 0.5 μm to about 25 μm.

7. The composite cathode active material of claim 1, wherein a content of the cobalt compound in the coating layer is about 0.5 parts to about 5.0 parts by weight with respect to 100 parts by weight of the composite cathode active material.

8. The composite cathode active material of claim 1, wherein the coating layer has a crystal phase or a spinel-like crystal phase, each belonging to the Space Group Fm-3m.

9. The composite cathode active material of claim 1, wherein the coating layer has a thickness of about 1 nm to about 50 nm.

10. A cathode comprising the composite cathode active material according to claim 1.

11. A lithium secondary battery comprising the cathode according to claim 10.

12. A method of preparing a composite cathode active material, the method comprising:
preparing a precursor compound of a lithium transition metal oxide represented by Formula 3;
thermally treating the precursor compound to thereby obtain a core comprising the lithium transition metal oxide;
forming, on a surface of the core, a coating layer comprising a cobalt oxide:

$$Li_xCo_{1-y-q-r}Ni_yM3_qM4_rO_2 \qquad \text{<Formula 3>}$$

wherein, in Formula 3, 1.00≤x≤1.04, 0.05≤y≤0.1, 0<q<0.005, 0<r<0.005, 0.001≤q+r≤0.007, and M3 and M4 are different from one another and are each independently selected from magnesium (Mg), and titanium (Ti).

13. The method of claim 12, wherein the preparing of the precursor compound of the lithium transition metal oxide comprises mechanically mixing a lithium precursor compound, a cobalt precursor compound, a nickel precursor compound, and a precursor compound including at least one element selected from magnesium (Mg) and titanium (Ti) in an atmospheric or oxidizing condition.

14. The method of claim 12, wherein the thermal treatment comprises a first thermal treatment step and a second thermal treatment step, the first thermal treatment step is followed by the second thermal treatment step, and a thermal treatment temperature in the first thermal treatment step is lower than a thermal treatment temperature in the second thermal treatment step.

15. The method of claim 14, wherein the first thermal treatment step comprises thermal treatment at a temperature of about 300° C. to about 500° C. under an atmospheric or oxidizing condition for about 3 hours to about 5 hours.

16. The method of claim 14, wherein the second thermal treatment step comprises thermal treatment at a temperature of about 700° C. to about 1000° C. under an atmospheric or oxidizing condition for about 5 hours to about 12 hours.

17. The method of claim 12, wherein the forming of the coating layer comprises:
mixing the core comprising the lithium transition metal oxide and a Co precursor compound to thereby prepare a mixture; and
thermally treating the mixture at a temperature of about 700'C to about 950'C in an atmospheric or oxidizing condition for about 3 hours to about 10 hours.

* * * * *